(12) United States Patent
Kashima

(10) Patent No.: US 9,212,574 B2
(45) Date of Patent: Dec. 15, 2015

(54) VALVE OPERATING SYSTEM FOR INTERNAL COMBUSTION ENGINE

(75) Inventor: Soji Kashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 914 days.

(21) Appl. No.: 13/395,020

(22) PCT Filed: Sep. 14, 2009

(86) PCT No.: PCT/JP2009/066006
§ 371 (c)(1),
(2), (4) Date: Mar. 8, 2012

(87) PCT Pub. No.: WO2011/030456
PCT Pub. Date: Mar. 17, 2011

(65) Prior Publication Data
US 2012/0167861 A1 Jul. 5, 2012

(51) Int. Cl.
*F01L 13/08* (2006.01)
*F02M 25/07* (2006.01)
*F01L 1/047* (2006.01)

(52) U.S. Cl.
CPC .............. *F01L 13/085* (2013.01); *F01L 13/08* (2013.01); *F02M 25/0752* (2013.01); *F01L 1/047* (2013.01); *F01L 2800/10* (2013.01); *F01L 2820/035* (2013.01); *Y02T 10/121* (2013.01)

(58) Field of Classification Search
CPC .............. F02M 25/0707; F02M 25/07; F02M 25/0752; F02L 13/08; F02L 13/085; F02L 2013/0084; F02L 2013/0089; F02L 2800/01; F02L 2800/10; F01L 13/08; F01L 2820/035; F01L 2013/0084
USPC .......... 123/568.11, 182.1, 90.1, 90.15, 90.16, 123/90.17, 90.32, 90.22, 90.23, 90.25, 123/568.14
See application file for complete search history.

(56) References Cited

U.S. PATENT DOCUMENTS 3,314,408 A * 4/1967 Fenton ........................ 123/182.1
4,977,868 A * 12/1990 Holschuh .................... 123/182.1

(Continued)

FOREIGN PATENT DOCUMENTS

CN 1648434 A 8/2005
CN 201225185 Y 4/2009

(Continued)

OTHER PUBLICATIONS

International Search Report of PCT/JP2009/066006, dated Oct. 27, 2009.

(Continued)

*Primary Examiner* — Stephen K Cronin
*Assistant Examiner* — Brian Kirby
(74) *Attorney, Agent, or Firm* — Westerman, Hattori, Daniels & Adrian, LLP

(57) ABSTRACT

A valve operating system for an internal combustion engine, which includes a decompression cam member (47) that is supported on a camshaft (26) and that operates an exhaust valve operating member (29e) in an opening direction of an exhaust valve (17e) in a compression stroke when the engine is started, an exhaust gas recirculation cam member (48) that is supported on the camshaft (26) and that operates the exhaust valve operating member (29e) in the opening direction of the exhaust valve (17e) in an intake stroke when the engine is running at high speed, and a centrifugal mechanism (46) that is mounted on a driven timing rotating member (32) rotating integrally with the valve operating cam (25) and makes the decompression cam member (47) and the exhaust gas recirculation cam member (48) move, wherein the valve operating cam (25) is provided with a recess (39) surrounding the camshaft (26), the recess (39) opening on the face on the other side of the driven timing rotating member (32) and on a base face of the valve operating cam (25), and the decompression cam member (47) and the exhaust gas recirculation cam member (48) are housed in the recess (39). This can provide a valve operating system for an internal combustion engine that can be made compact in spite of a driven timing rotating member and an exhaust cam being installed.

3 Claims, 13 Drawing Sheets

(56) References Cited

U.S. PATENT DOCUMENTS

| | | | |
|---|---|---|---|
| 4,991,551 A * | 2/1991 | Terai et al. | 123/198 D |
| 5,823,153 A | 10/1998 | Santi et al. | |
| 5,943,992 A * | 8/1999 | Kojima et al. | 123/182.1 |
| 6,055,952 A * | 5/2000 | Gau | 123/182.1 |
| 6,109,230 A * | 8/2000 | Watanabe et al. | 123/182.1 |
| 6,343,582 B1 * | 2/2002 | Peng | 123/182.1 |
| 6,394,054 B1 * | 5/2002 | Rado et al. | 123/182.1 |
| 6,494,175 B2 * | 12/2002 | Gracyalny | 123/182.1 |
| 6,782,861 B2 * | 8/2004 | Gracyalny et al. | 123/182.1 |
| 6,848,407 B2 * | 2/2005 | Kobayashi et al. | 123/182.1 |
| 7,064,454 B2 * | 6/2006 | Fukaya et al. | 290/1 A |
| 7,131,407 B2 * | 11/2006 | Kashima et al. | 123/90.1 |
| 7,174,871 B2 * | 2/2007 | Grybush | 123/182.1 |
| 7,261,077 B2 * | 8/2007 | Asano et al. | 123/182.1 |
| 7,263,960 B2 * | 9/2007 | Saito et al. | 123/182.1 |
| 7,328,678 B2 * | 2/2008 | Grybush | 123/182.1 |
| 7,552,706 B2 * | 6/2009 | Krueger | 123/182.1 |
| 2003/0024495 A1 | 2/2003 | Gracyalny et al. | |
| 2003/0183185 A1 * | 10/2003 | Sun et al. | 123/179.16 |
| 2003/0188707 A1 * | 10/2003 | Takada et al. | 123/182.1 |
| 2005/0178370 A1 * | 8/2005 | Kashima et al. | 123/568.14 |
| 2008/0072853 A1 | 3/2008 | Vanderpoel | |
| 2009/0282819 A1 * | 11/2009 | Kashima | 60/317 |
| 2009/0320792 A1 * | 12/2009 | Kashima | 123/347 |

FOREIGN PATENT DOCUMENTS

| | | |
|---|---|---|
| CN | 201225186 Y | 4/2009 |
| EP | 1 557 541 A2 | 7/2005 |
| EP | 1 703 123 A1 | 9/2006 |
| JP | 11-093631 A | 4/1999 |
| JP | 2002-285812 A | 10/2002 |
| JP | 2005-233176 A | 9/2005 |
| JP | 2005-240793 A | 9/2005 |
| JP | 2006-226256 A | 8/2006 |
| JP | 2009264251 A * | 11/2009 |

OTHER PUBLICATIONS

Chinese Office Action dated Jun. 6, 2013, issued in corresponding Chinese Patent Application No. 200980161419.2 (6 pages).
European Search Report dated Oct. 16, 2013, issued in European Patent Application No. 09849234.1.

* cited by examiner

DECOMPRESSION STATE (Ne < Ne1)

DECOMPRESSION STATE (Ne < Ne1)

DECOMPRESSION STATE (Ne < Ne1)

VALVE OPERATING SYSTEM FOR INTERNAL COMBUSTION ENGINE

TECHNICAL FIELD

The present invention relates to an improvement of a valve operating system for an internal combustion engine, the valve operating system including a decompression cam member that is supported on a camshaft provided with a valve operating cam and that moves between an operating position in which an exhaust valve operating member is operated in an opening direction of an exhaust valve in a compression stroke of the engine and a non-operational position in which the exhaust valve valve-operating member is released, an exhaust gas recirculation cam member that is supported on the camshaft and that moves between a non-operational position in which the exhaust valve operating member is released and an operating position in which the exhaust valve operating member can be operated in the opening direction of the exhaust valve in an intake stroke of the engine, and a centrifugal mechanism that is mounted on a driven timing rotating member driven by a crankshaft so as to rotate integrally with the valve operating cam, that makes the decompression cam member move to the operating position in a starting rotational region of the engine and to the non-operational position after starting, and that makes the exhaust gas recirculation cam member move to the non-operational position in a low-speed running region of the engine and to the operating position in a high-speed running region.

BACKGROUND ART

Such a valve operating system for an internal combustion engine is already known, as disclosed in Patent Publication 1 below.
Patent Publication 1: Japanese Patent Application Laid-open No. 2005-240793

DISCLOSURE OF INVENTION

Problems to Be Solved by the Invention

In such a conventional valve operating system for an internal combustion engine, since a camshaft provided with an exhaust cam and an intake cam is connected to a driven timing rotating member, a decompression cam member and an exhaust gas recirculation cam member supported on this camshaft are disposed between the driven timing rotating member and the exhaust cam, it is necessary to ensure that there is sufficient space between the driven timing rotating member and the exhaust cam in order to dispose the driven timing rotating member and the exhaust cam, and this prevents the valve operating system from being made compact.

The present invention has been accomplished in light of such circumstances, and it is an object thereof to provide a valve operating system for an internal combustion engine that can be made compact in spite of a driven timing rotating member and an exhaust cam being installed.

Means for Solving the Problems

In order to attain the above object, according to a first aspect of the present invention, there is provided a valve operating system of an internal combustion engine, the valve operating system comprising a decompression cam member that is supported on a camshaft provided with a valve operating cam and that moves between an operating position in which an exhaust valve operating member is operated in an opening direction of an exhaust valve in a compression stroke of the engine and a non-operational position in which the exhaust valve valve-operating member is released, an exhaust gas recirculation cam member that is supported on the camshaft and that moves between a non-operational position in which the exhaust valve operating member is released and an operating position in which the exhaust valve operating member can be operated in the opening direction of the exhaust valve in an intake stroke of the engine, and a centrifugal mechanism that is mounted on a driven timing rotating member driven by the crankshaft so as to rotate integrally with the valve operating cam, that makes the decompression cam member move to the operating position in a starting rotational region of the engine and to the non-operational position after starting, and that makes the exhaust gas recirculation cam member move to the non-operational position in a low-speed running region of the engine and to the operating position in a high-speed running region, characterized in that the valve operating cam is provided with a recess surrounding the camshaft, the recess opening on a face on the other side of the driven timing rotating member and on a base face of the valve operating cam, and the decompression cam member and the exhaust gas recirculation cam member are housed in the recess. The intake valve operating member and the exhaust valve operating member correspond to an intake rocker arm 29$i$ and an exhaust rocker arm 29$e$ respectively in an embodiment of the present invention, which is described later, and the driven timing rotating member corresponds to a driven timing pulley 32.

According to a second aspect of the present invention, in addition to the first aspect, the valve operating cam is fitted onto and secured to the camshaft, which is a separate body from the valve operating cam.

According to a third aspect of the present invention, in addition to the first aspect, the centrifugal mechanism comprises a first centrifugal weight that is axially supported by the driven timing rotating member, swings from a contracted position to an intermediate extension position according to an increase in centrifugal force, and is prevented from swinging therebeyond, a second centrifugal weight that is similarly axially supported by the driven timing rotating member, swings together with the first centrifugal weight from a contracted position to an intermediate extension position according to an increase in centrifugal force, and swings on its own to an extended position according to an increase in centrifugal force after the first centrifugal weight stops at the intermediate extension position, and a return spring between the second centrifugal weight and the driven timing rotating member, the return spring urging the second centrifugal weight toward the contracted position side, the second centrifugal weight is operatively connected to the decompression cam member and the exhaust gas recirculation cam member, when the second centrifugal weight occupies the contracted position the decompression cam member is controlled at the operating position and the exhaust gas recirculation cam member is controlled at the non-operational position, when the second centrifugal weight occupies the intermediate extension position both the decompression cam member and the exhaust gas recirculation cam member are controlled at the non-operational positions, and when the second centrifugal weight occupies the extended position the decompression cam member is controlled at the non-operational position and the exhaust gas recirculation cam member is controlled at the operating position.

According to a fourth aspect of the present invention, in addition to the third aspect, an intake valve operating member and the exhaust valve operating member are in sliding contact with an outer peripheral face of the valve operating cam with mutually displaced phases.

Effects of the Invention

In accordance with the first aspect of the present invention, the decompression cam member and the exhaust gas recirculation cam member can be housed compactly within the valve operating cam, thus making the valve operating system compact.

In accordance with the second aspect of the present invention, forming the valve operating cam and the camshaft individually enables the recess to be formed in the valve operating cam without interference from the camshaft, thereby reducing the cost of the valve operating system.

In accordance with the third aspect of the present invention, setting the contracted position and the intermediate extension position for the first and second centrifugal weights and the extended position for the second centrifugal weight enables the operational timing for the decompression cam member and the exhaust gas recirculation cam member to be easily and reliably achieved.

In accordance with the fourth aspect of the present invention, the intake and exhaust valves can be opened and closed by one common valve operating cam, thus making the valve operating system more compact.

EXPLANATION OF REFERENCE NUMERALS AND SYMBOLS

Figure 1:
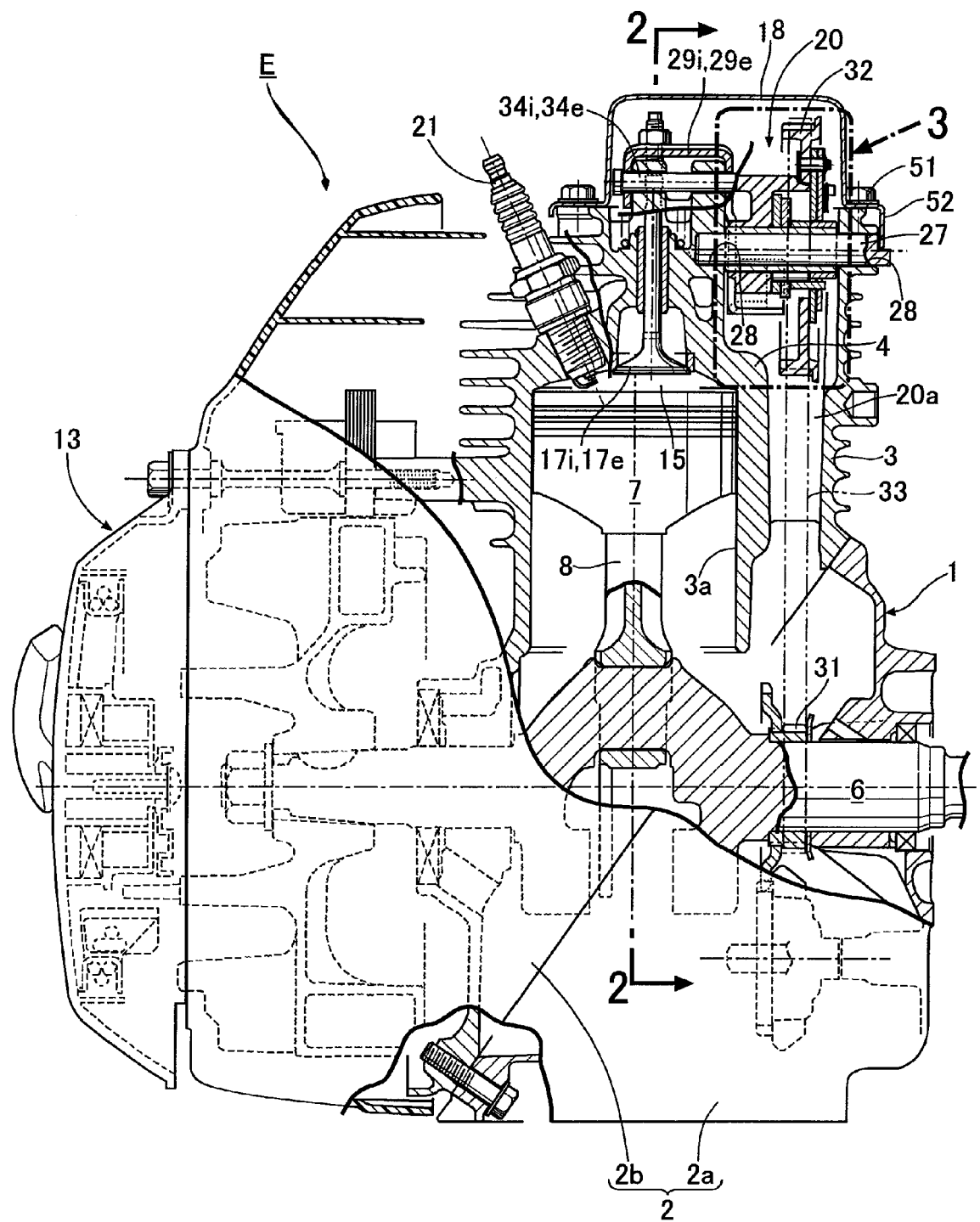
FIG. 1 is a longitudinal sectional front view of an essential part of an internal combustion engine equipped with a valve operating system related to an embodiment of the present invention. (first embodiment)

E Internal combustion engine
A Contracted position of first and second centrifugal weights
M Intermediate extension position of first and second centrifugal weights
B Extended position of second centrifugal weight
C Operating position of decompression cam member
D Non-operational position of decompression cam member
F Non-operational position of exhaust gas recirculation cam member
G Operating position of exhaust gas recirculation cam member
6 Crankshaft
17e Exhaust valve
20 Valve operating system
25 Valve operating cam
26 Camshaft
29i Intake valve operating member (intake rocker arm)
29e Exhaust valve operating member (exhaust rocker arm)
32 Driven rotating member (driven timing pulley)
351 First centrifugal weight
352 Second centrifugal weight
39 Recess
43 Return spring
46 Centrifugal mechanism
47 Decompression cam member
48 Exhaust gas recirculation cam member

BEST MODE FOR CARRYING OUT THE INVENTION

A mode for carrying out the present invention is explained below by reference to a preferred embodiment of the present invention shown in the drawings.

Embodiment 1

In FIG. 1, an engine main body 1 of an internal combustion engine E is formed from a crankcase 2 in which a first case half 2a and a second case half 2b are joined by a bolt on inclined faces that obliquely intersect the axis of a crankshaft 6, a cylinder block 3 extending upward from the second case half 2b, and a cylinder head 4 integrally molded with an upper end part of the cylinder block 3. The crankcase 2 houses the crankshaft 6, which is supported by left and right side walls thereof, and the crankshaft 6 is connected via a connecting rod 8 to a piston 7 fitted into a cylinder bore 3a of the cylinder block 3. A known recoil type starter 13 that can crank the crankshaft 6 is attached to one side of the engine main body 1.

Figure 2:
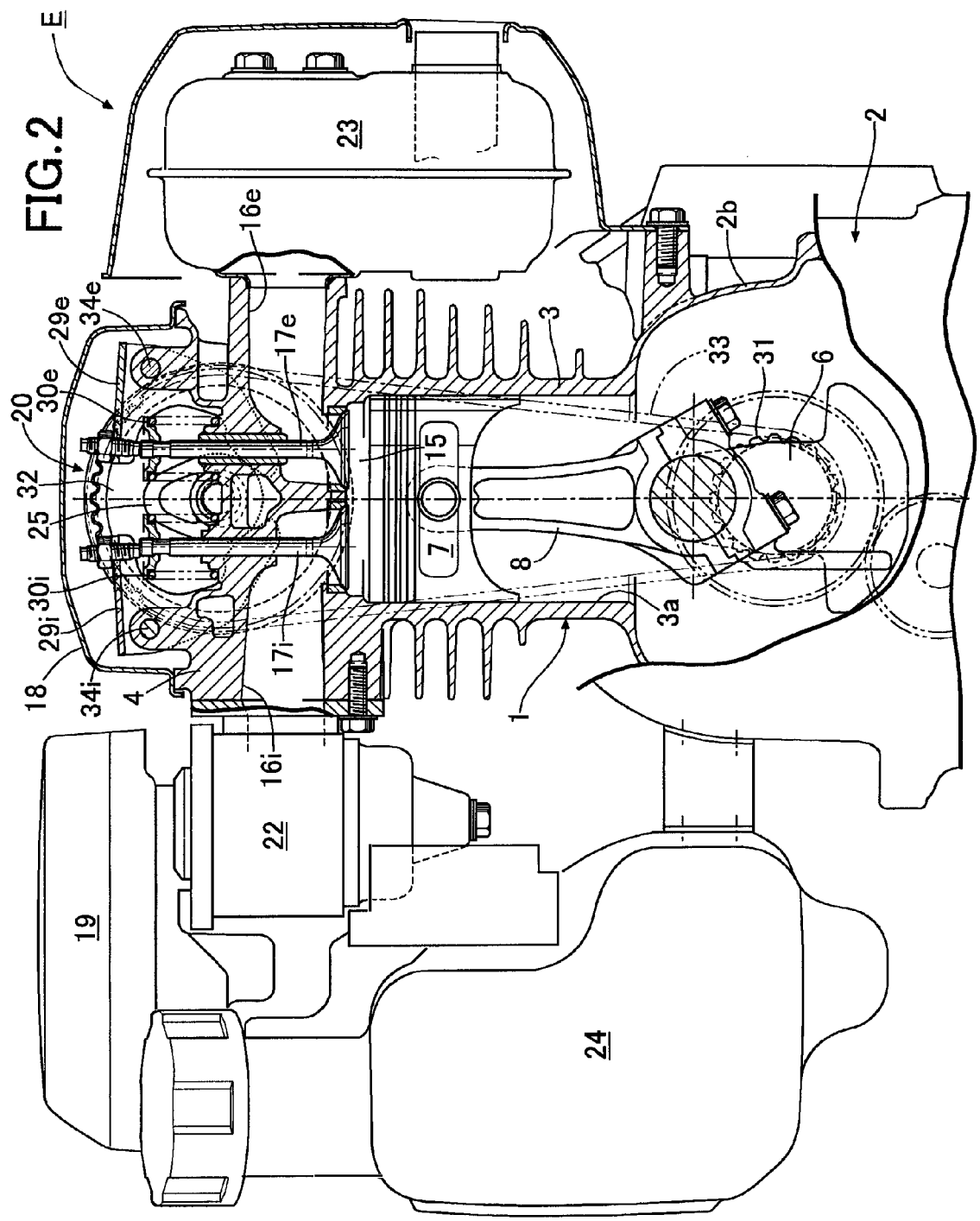
FIG. 2 is a sectional view along line 2-2 in FIG. 1. (first embodiment)

In FIG. 1 and FIG. 2, formed in the cylinder head 4 are a combustion chamber 15 communicating with the cylinder bore 3a, and an intake port 16i and an exhaust port 16e having their inner ends opening in the combustion chamber 15, provided on the cylinder head 4 are an intake valve 17i and an exhaust valve 17e for opening and closing the intake port 16i and the exhaust port 16e, and mounted on the intake and exhaust valves 17i and 17e are intake and exhaust valve springs 30i and 30e respectively for urging the valves 17i and 17e respectively in a valve-closing direction. A valve operating system 20 for driving the intake valve 17i and the exhaust valve 17e for opening and closing in cooperation with the valve springs 30i and 30e is disposed from the crankcase 2 to the cylinder head 4. This valve operating system 20 is explained in detail later.

Screwed into the cylinder head 4 is a spark plug 21 having an electrode facing the combustion chamber 15, mounted on the cylinder head 4 are a carburetor 22 and an exhaust muffler 23 communicating with outer ends of the intake port 16i and the exhaust port 16e respectively, and attached to an air intake path inlet of the carburetor 22 is an air cleaner 19.

Furthermore, mounted on an upper part of the crankcase 2 is a fuel tank 24 adjacent to the carburetor 22 and the exhaust muffler 23.

The valve operating system 20 is now explained.

Figure 3:
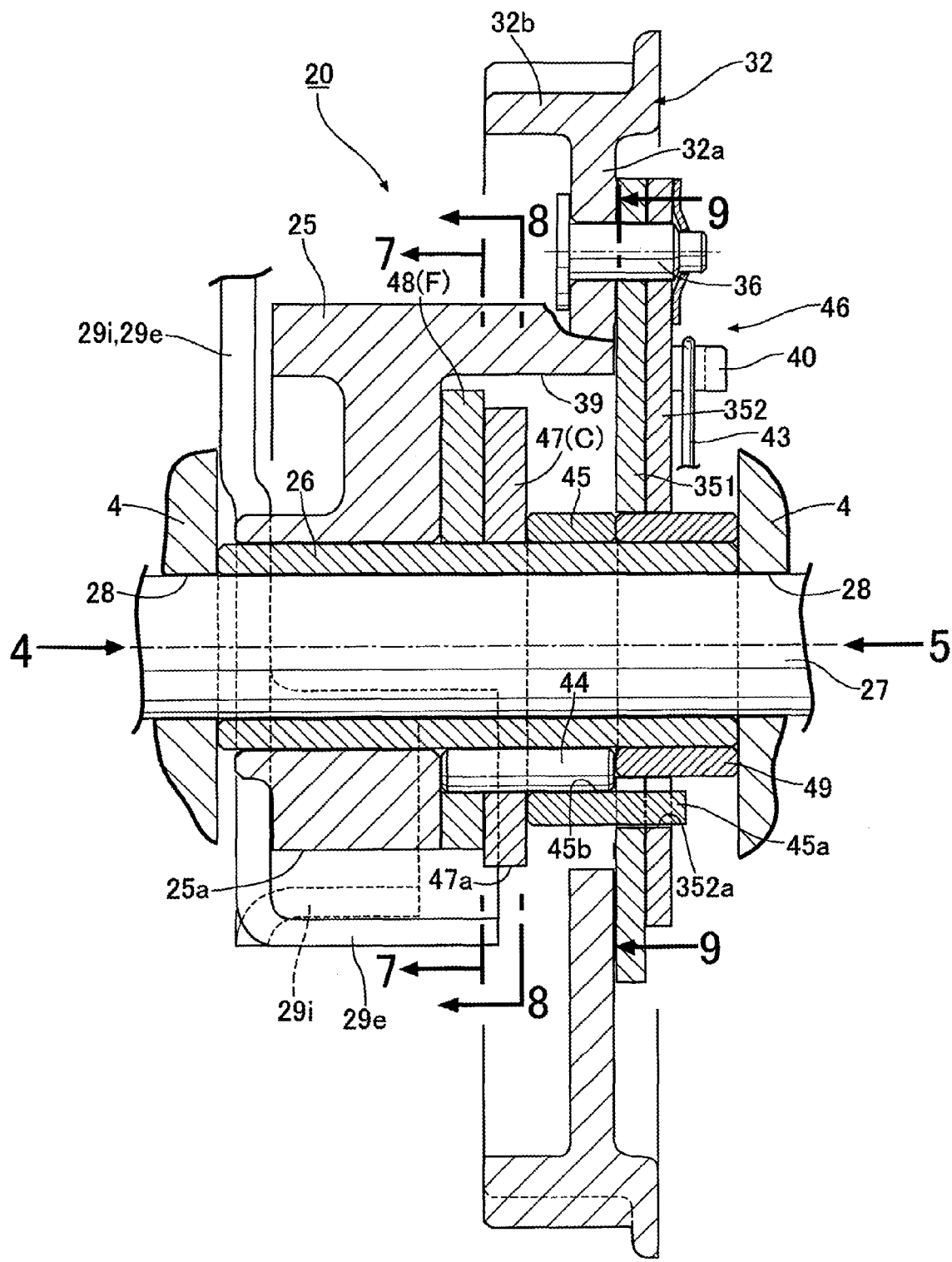
FIG. 3 is an enlarged view of part 3 in FIG. 1. (first embodiment)

As shown in FIG. 1 to FIG. 3, a valve operating chamber 20a is formed that runs from the cylinder block 3 to the cylinder head 4, the valve operating chamber 20a extending upward from the interior of the crankcase 2 and being adjacent to one side of the cylinder bore 3a, and the valve operating system 20 is disposed in the valve operating chamber 20a. This valve operating system 20 includes a support shaft 27 disposed in parallel to the crankshaft 6 so as to traverse an upper part of the valve operating chamber 20a, and a hollow cylindrical camshaft 26 rotatably supported on the support shaft 27. The support shaft 27 has its opposite ends fitted into a pair of support holes 28 and 28 of mutually opposing side walls of the valve operating chamber 20a, and is fixed to the cylinder head 4 by retaining an outer end part of the support shaft 27 with a retaining plate 52 secured to the outside of the cylinder head 4 by a bolt 51.

As shown in FIG. 3 to FIG. 6, a single valve operating cam 25 is fitted around and secured to the outer periphery of one end part of the camshaft 26 by press-fitting, etc. A driven timing pulley 32 surrounding the other end part of the camshaft 26 is integrally molded at one end of the valve operating cam 25, and this driven timing pulley 32 is driven via a timing belt 33 at a reduction ratio of ½ from a drive timing pulley 31 secured to the crankshaft 6.

Mounted on the cylinder head 4 are an intake rocker shaft 34i and an exhaust rocker shaft 34e that are parallel to the camshaft 26 and are disposed on opposite sides of the intake and exhaust valves 17i and 17e, swingably supported on the intake rocker shaft 34i is an intake rocker arm 29i providing a connection between the valve operating cam 25 and the intake valve 17i, and swingably supported on the exhaust rocker shaft 34e is an exhaust rocker arm 29e providing a connection between the valve operating cam 25 and the exhaust valve 17e. These intake and exhaust rocker arms 29i and 29e have mutually different contact phases with the valve operating cam 25, receive a lifting action from the valve operating cam 25 at predetermined timings, and open and close the intake and exhaust valves 17i and 17e respectively in cooperation with the intake and exhaust valve springs 30i and 30e.

The valve operating system 20 is arranged as described above, and a head cover 18 covering the valve operating system 20 from above is joined to an upper end face of the cylinder head 4.

Figure 4:
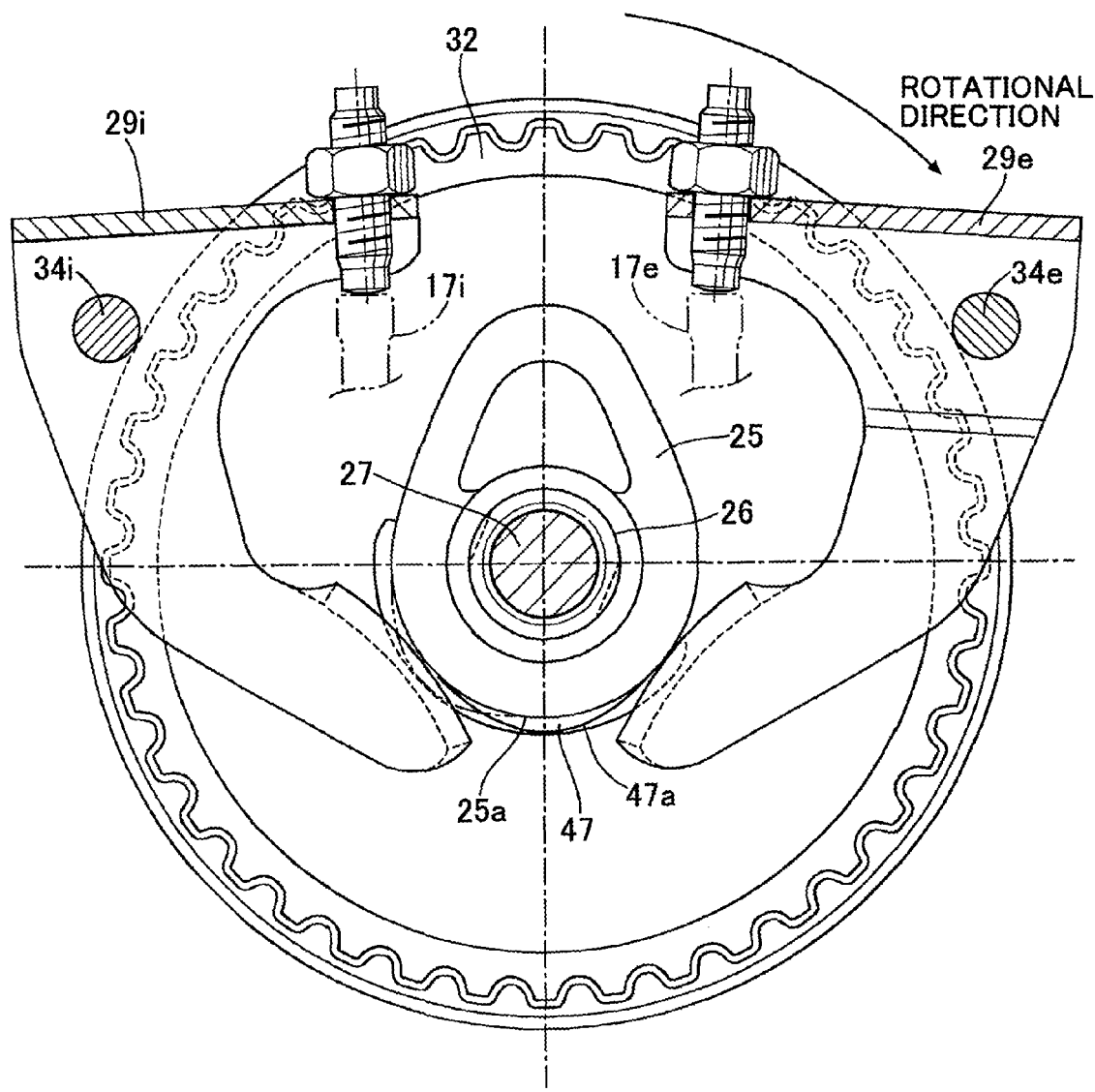
FIG. 4 is a view from arrow 4 in FIG. 2. (first embodiment)
Figure 5:
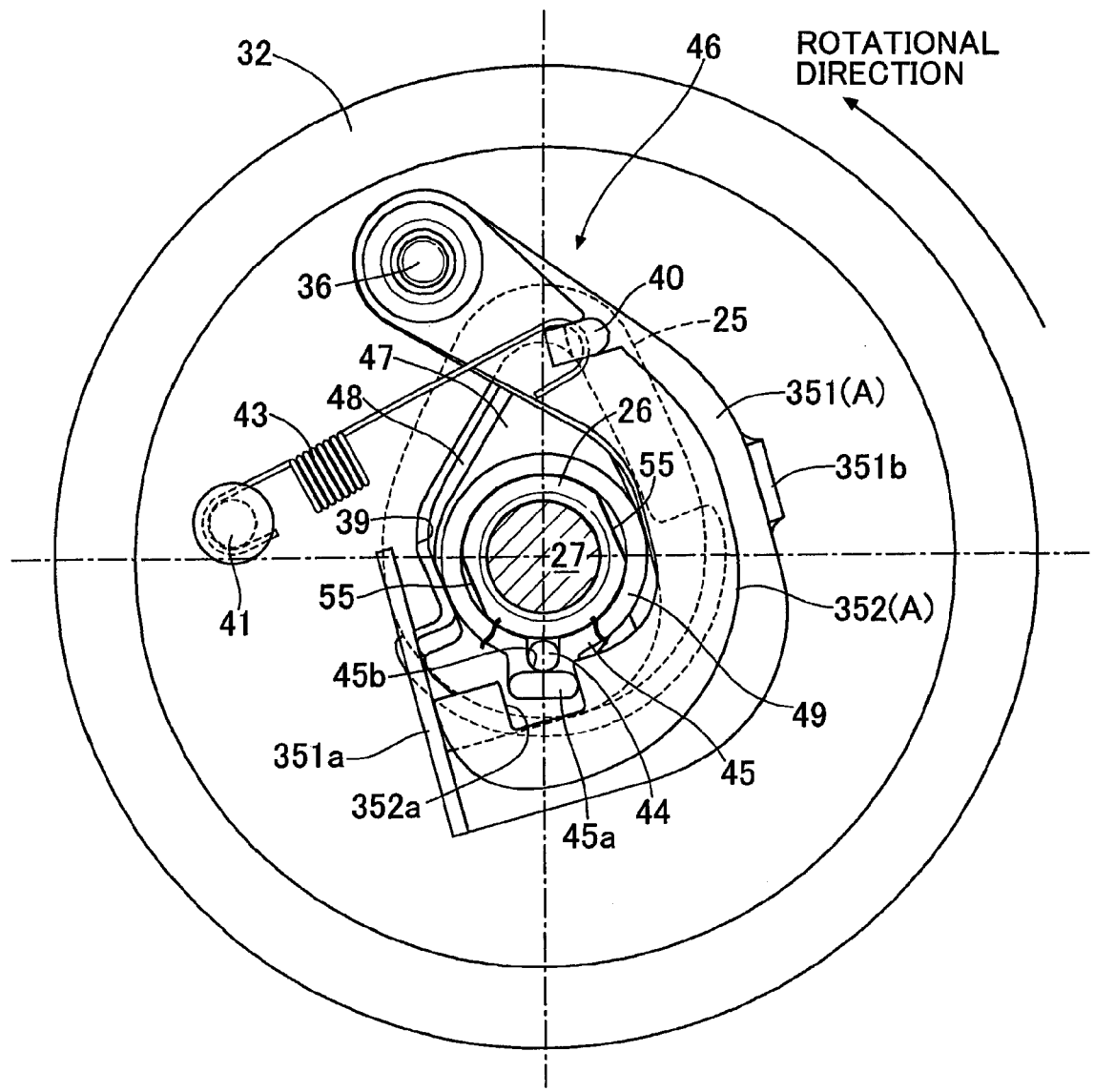
FIG. 5 is a view from arrow 5 in FIG. 3. (first embodiment)
Figure 6:
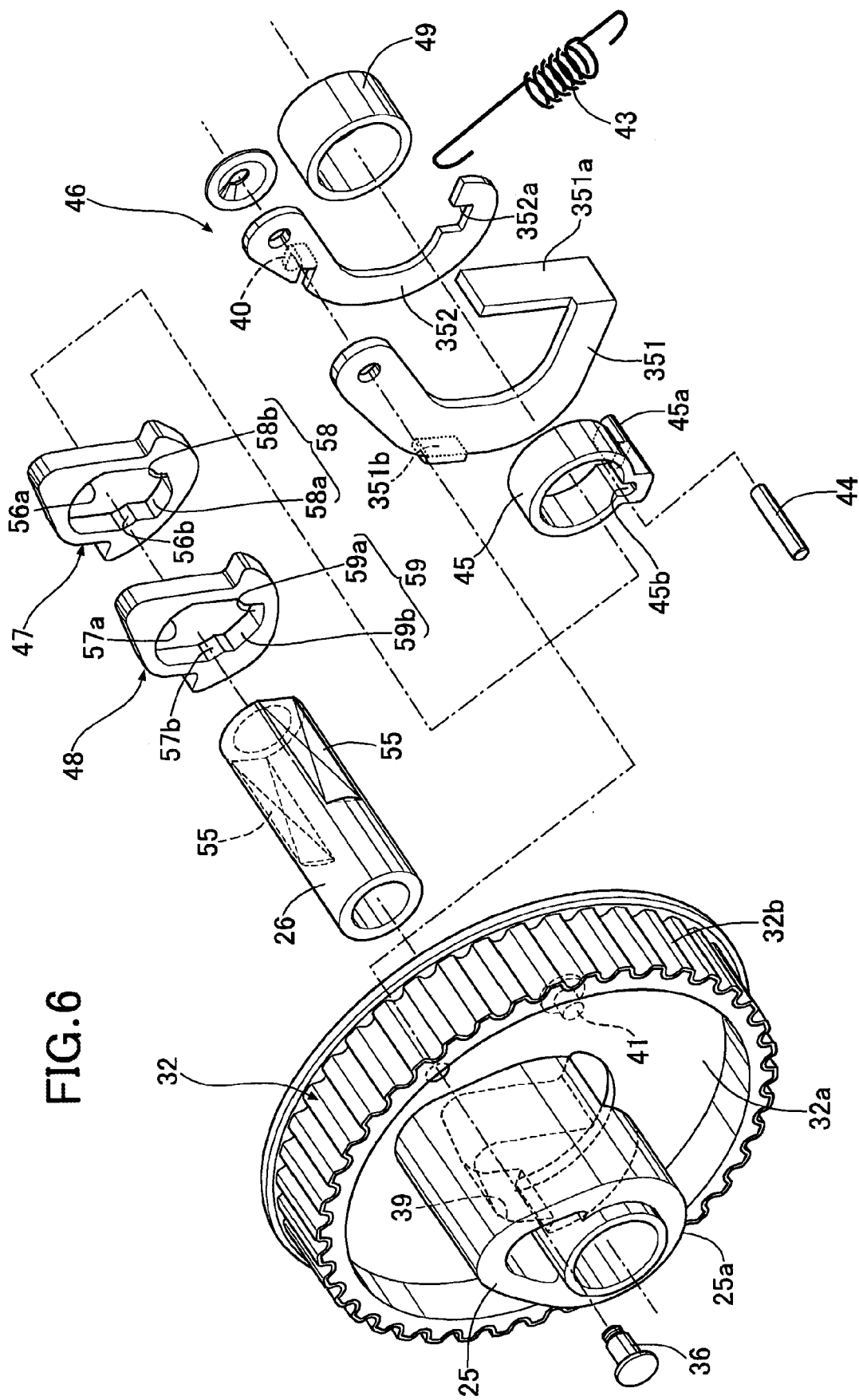
FIG. 6 is an exploded perspective view of an essential part of the valve operating system. (first embodiment)

As shown in FIG. 4 to FIG. 6, the driven timing pulley 32 is formed from an arm wall 32a spreading out in the radial direction from one end part of the valve operating cam 25, and a toothed rim 32b formed on the outer periphery of the arm wall 32a, one end part of each of first and second centrifugal weights 351 and 352 formed in a substantially U shape so as to surround half of the periphery of the camshaft 26 being swingably supported by a single pivot shaft 36 fixedly provided on the arm wall 32a so as to project on the outside face thereof. The first and second centrifugal weights 351 and 352 have a plate shape and are mutually superimposed, and an abutment piece 351a is formed at the swinging end of the first centrifugal weight 351 on the side opposite to the pivot shaft 36, the swinging end of the second centrifugal weight 352 being capable of abutting against the abutment piece 351a.

The first centrifugal weight 351 thus swings around the pivot shaft 36 from a contracted position A (see FIG. 5) in which its U-shaped bent portion abuts against an outer peripheral face of a distance collar 49 on the camshaft 26 to an intermediate extension position M (see FIG. 10) in which the abutment piece 351a abuts against the outer peripheral face of the distance collar 49, and does not swing beyond the intermediate extension position M. Furthermore, the second centrifugal weight 352 is capable of swinging around the pivot shaft 36 from a contracted position A to an extended position B via an intermediate operating position M; the contracted position A (see FIG. 5) for the second centrifugal weight 352 is defined by the swinging end of the second centrifugal weight 352 abutting against the abutment piece 351a when the first centrifugal weight 351 is in the contracted position A, the intermediate extension position M (see FIG. 10) for the second centrifugal weight 352 is defined by the swinging end of the second centrifugal weight 352 abutting against the abutment piece 351a when the first centrifugal weight 351 is in the intermediate extension position M, and the extended position B (see FIG. 11) for the second centrifugal weight 352 is defined, when the first centrifugal weight 351 is restrained to the intermediate extension position M, by the second centrifugal weight 352 being separated from the abutment piece 351a by a predetermined distance and abutting against a stopper piece 351b formed on a side edge of the first centrifugal weight 351 on the side opposite to the abutment piece 351a. A return spring 43 for urging the second centrifugal weight 352 toward the contracted position A side with a predetermined set load is provided in an extended state between a latching tab 40 of the second centrifugal weight 352 and a latching pin 41 of the arm wall 32a. A centrifugal mechanism 46 for operating a drive ring 45, which is described later, is formed from the first centrifugal weight 351, the second centrifugal weight 352, and the return spring 43.

As shown in FIG. 3 and FIG. 7 to FIG. 9, the valve operating cam 25 is provided with a recess 39 surrounding the camshaft 26, the recess 39 opening on an outside face of the driven timing pulley 32 and on a base circle face 25a of the valve operating cam 25, and in this recess 39 an exhaust gas recirculation cam member 48, a decompression cam member 47, the drive ring 45, and the distance collar 49 are fitted onto the camshaft 26 in sequence from the valve operating cam 25 side. The exhaust gas recirculation cam member 48, the decompression cam member 47, and the drive ring 45 are therefore all housed in the recess 39 of the valve operating cam 25.

In FIG. 3 and FIG. 5 to FIG. 9, the drive ring 45 is rotatably fitted onto an outer peripheral face of the camshaft 26, a connecting projection 45a is integrally formed with the drive ring 45, the connecting projection 45a projecting from the outer peripheral face thereof and extending toward the first and second centrifugal weights 351 and 352 side, and this connecting projection 45a engages with a connection groove 352a provided on the inner periphery of the swinging end part of the second centrifugal weight 352. When the second centrifugal weight 352 swings in the radial direction, the drive ring 45 is pivoted via the connecting projection 45a. Furthermore, the drive ring 45 has in the axial direction on its inner peripheral face a retaining groove 45b, and a roller 44 is retained by this retaining groove 45b, the roller 44 extending in the axial direction of the camshaft 26 from the driven timing pulley 32 to the valve operating cam 26e. This roller 44 can roll on the outer peripheral face of the camshaft 26 by rotation of the drive ring 45 relative to the camshaft 26.

In FIG. 7 to FIG. 11, the decompression cam member 47 and the exhaust gas recirculation cam member 48 are fitted onto a pair of mutually parallel guide faces 55 and 55, formed on opposite side faces of the camshaft 26, so that they can slide along a diameter of the camshaft 26. The decompression cam member 47 can thereby slide between an operating position C (FIG. 8) and a non-operational position D (FIG. 10) along the guide faces 55 and 55, and the operating position C and the non-operational position D are defined by inner end faces 56a and 56b of the decompression cam member 47 abutting against the outer peripheral face of the camshaft 26, the inner end faces 56a and 56b being in a direction perpendicular to the guide faces 55 and 55. Furthermore, the exhaust gas recirculation cam member 48 can slide between a non-operational position F (FIG. 7) and an operating position G (FIG. 11) along the guide faces 55 and 55, and the operating position F and the non-operational position G are defined by inner end faces 57a and 57b of the exhaust gas recirculation cam member 48 abutting against the outer peripheral face of the camshaft 26, the inner end faces 57a and 57b being in a direction perpendicular to the guide faces 55 and 55.

The decompression cam member 47 and the exhaust gas recirculation cam member 48 integrally have on their outer peripheral faces convex cams 47a and 48a that are much lower than a nose portion of the valve operating cam 25, and these convex cams 47a and 48a project outside the base circle face 25a of the valve operating cam 25 at the operating positions C and G and are withdrawn inside the base circle face 25a at the non-operational positions D and F. Moreover, the convex cam 47a of the decompression cam member 47 is disposed so as to push up the exhaust rocker arm 29e during a compression stroke of the engine when the decompression cam member 47 occupies the operating position C, and the convex cam 48a of the exhaust gas recirculation cam member 48 is disposed so as to push up the exhaust rocker arm 29e during intake stroke of the engine when the exhaust gas recirculation cam member 48 occupies the operating position G.

Figure 8:
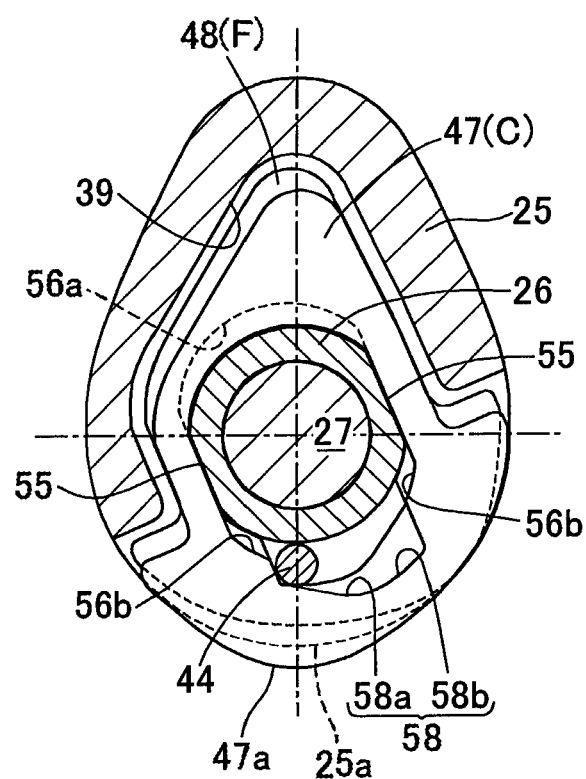
FIG. 8 is a sectional view along line 8-8 in FIG. 3. (first embodiment)
Figure 9:
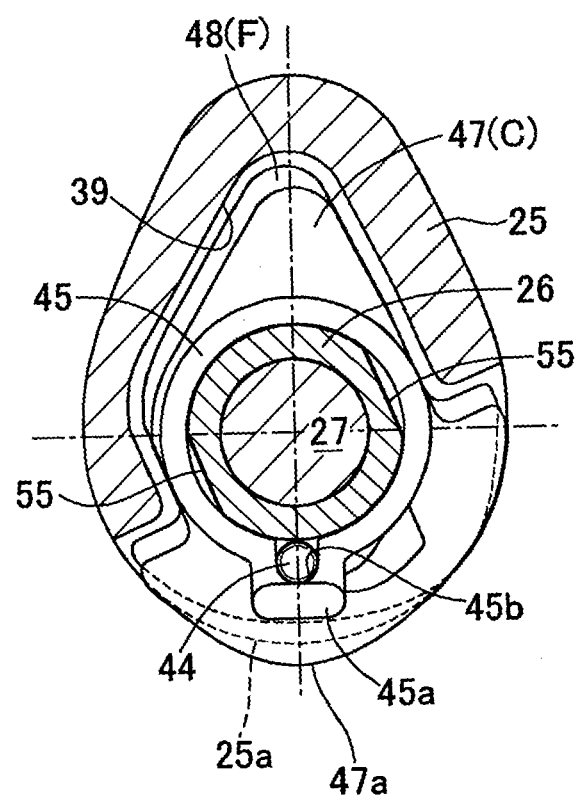
FIG. 9 is a sectional view along line 9-9 in FIG. 3. (first embodiment)

As shown in FIG. 8, a concave cam 58 is formed in a central part of the inner end face 56b, on the convex cam 47a side, of the decompression cam member 47, the concave cam 58 operating in cooperation with the roller 44. This concave cam 58 is formed from an inclined face 58a that forces the decompression cam member 47 to the operating position C by being pressed by the roller 44 when the second centrifugal weight 352 is retained at the contracted position A by the urging force of the return spring 43, and an arc-shaped bottom face 58b that allows the decompression cam member 47 to move to the non-operational position D by avoiding interference with the roller 44 when the second centrifugal weight 352 swings to the intermediate extension position M. The decompression cam member 47 has its center of gravity offset from the center of the decompression cam member 47 toward the side opposite to the concave cam 58, and when the roller 44 attains a position facing the arc-shaped bottom face 58b the decompression cam member 47 moves to the non-operational position D by centrifugal force acting on the center of gravity.

Figure 7:
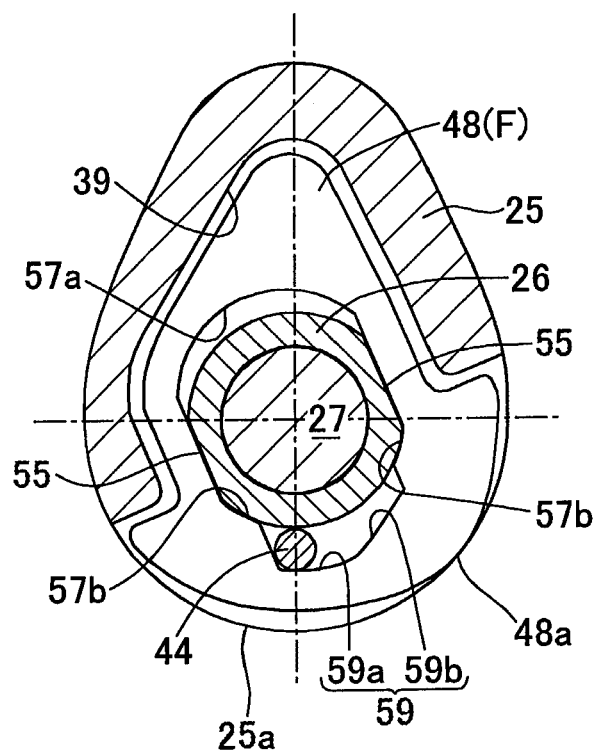
FIG. 7 is a sectional view along line 7-7 in FIG. 3. (first embodiment)
Figure 11:
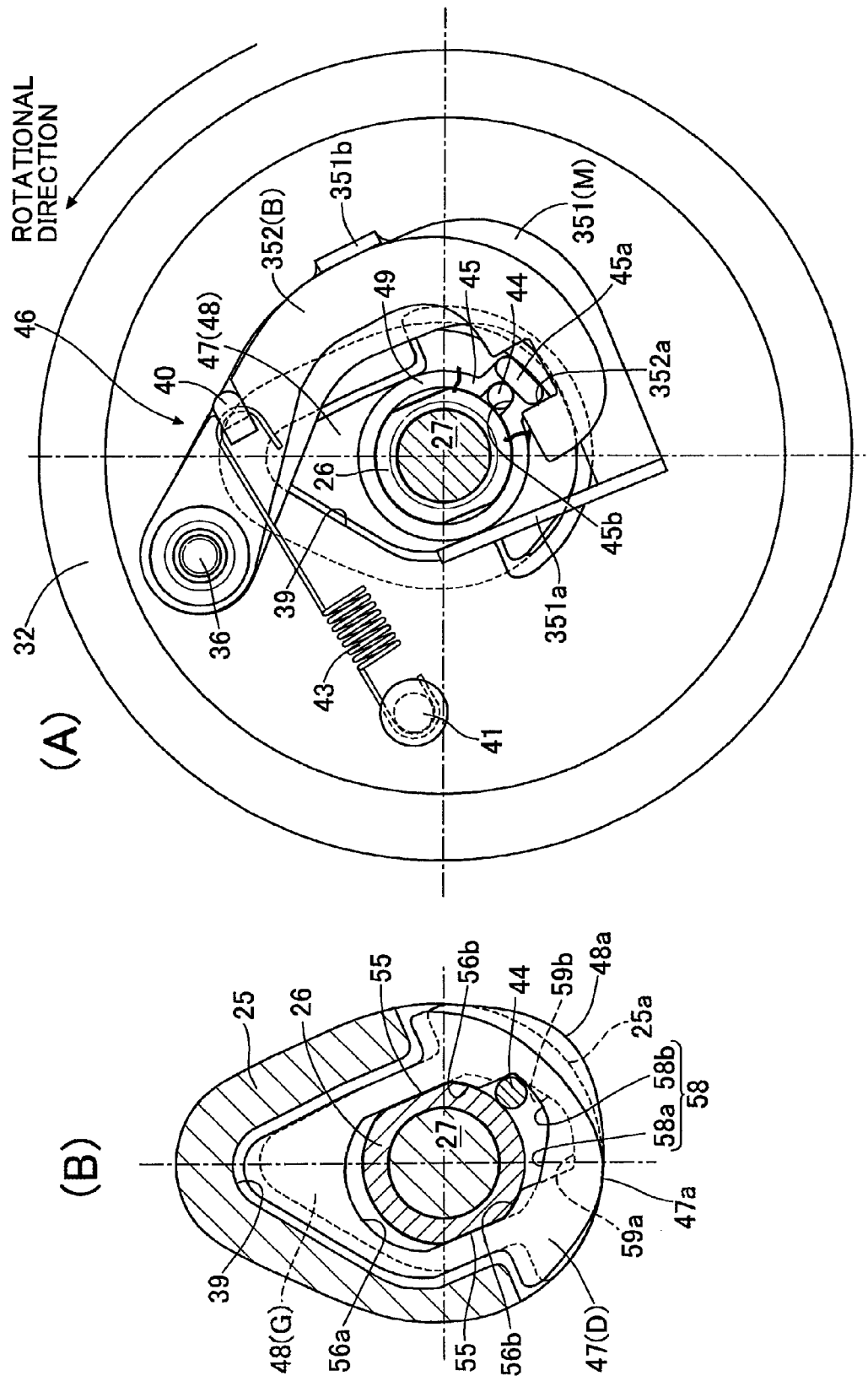
FIG. 11 is an operation diagram of the valve operating system showing an exhaust gas recirculation state. (first embodiment)

On the other hand, as shown in FIG. 7 and FIG. 11, a concave cam 59 is formed in a central part of the inner end face 57b, on the convex cam 48a side, of the exhaust gas recirculation cam member 48, the concave cam 59 operating in cooperation with the roller 44. This concave cam 59 is formed from an arc-shaped bottom face 59a that allows the exhaust gas recirculation cam member 48 to move to the non-operational position F by avoiding interference with the roller 44 while the second centrifugal weight 352 rotates from the contracted position A to the intermediate extension position M, and an inclined face 59b that forces the exhaust gas recirculation cam member 48 to the operating position G by being pressed by the roller 44 when the second centrifugal weight 352 swings to the extended position B. The exhaust gas recirculation cam member 48 has its center of gravity offset from the center of the exhaust gas recirculation cam member 48 toward the side opposite to the concave cam 59, and when the roller 44 is at a position facing the arc-shaped bottom face 59a the exhaust gas recirculation cam member 48 moves to the non-operational position G by centrifugal force acting on the center of gravity.

The operation of this embodiment is now explained.

Figure 13:
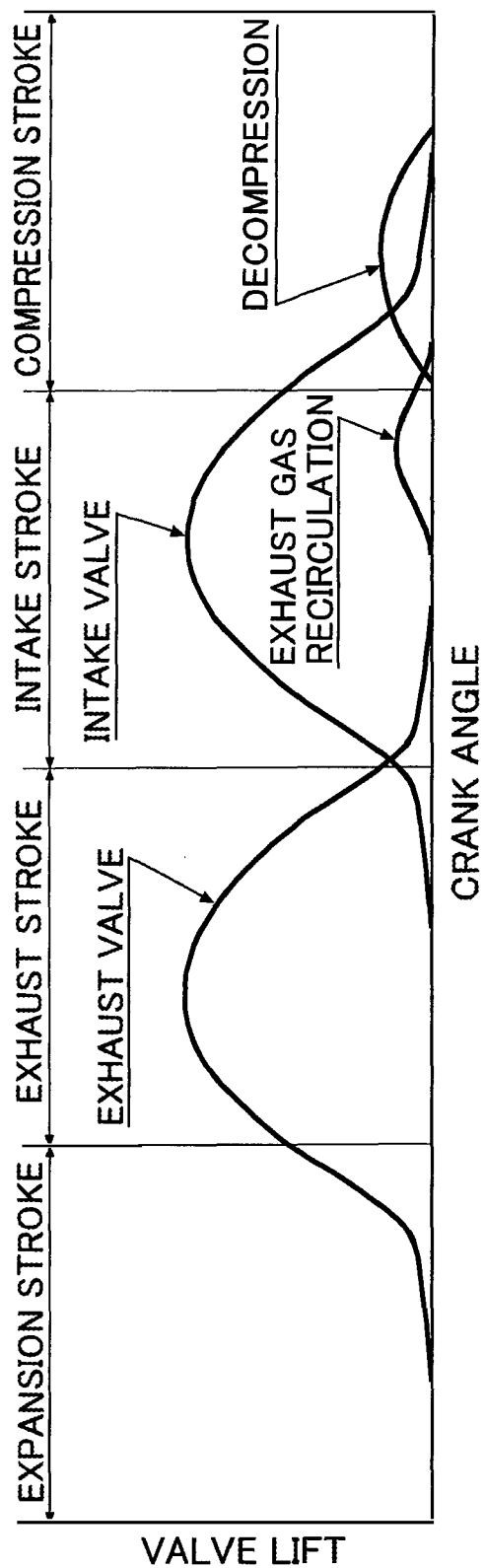
FIG. 13 is a graph showing the relationship between crankshaft rotational angle and opening/closing timing of an intake valve and an exhaust valve. (first embodiment)

When the crankshaft 6 rotates, since the drive timing pulley 31 drives the driven timing pulley 32 via the timing belt 33, the valve operating cam 25, which is integral with the driven timing pulley 32, is also driven to rotate. During the intake stroke, the nose portion of the valve operating cam 25 swings the intake rocker arm 29i to thus push and open the intake valve 17i against the urging force of the intake valve spring 30i. Similarly, during the exhaust stroke, the nose portion of the valve operating cam 25 swings the exhaust rocker arm 29e so as to push and open the exhaust valve 17e. The opening/closing timings of the intake valve 17i and the exhaust valve 17e are shown in FIG. 13.

Figure 12:
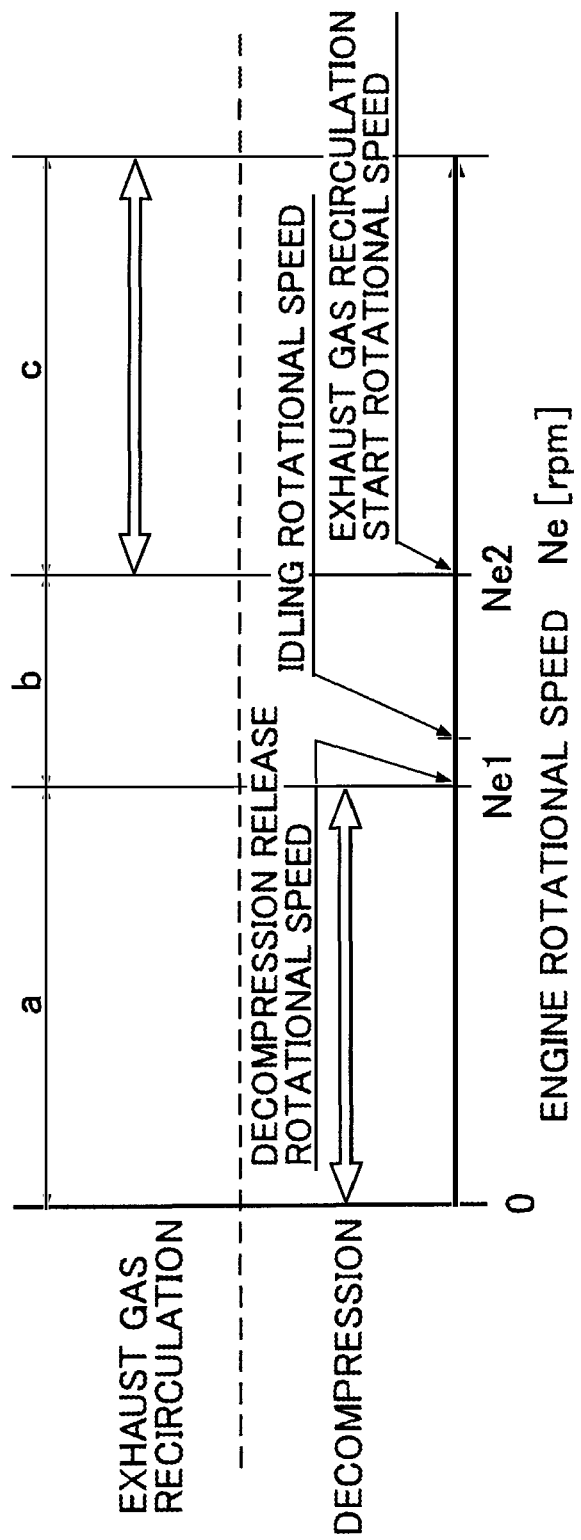
FIG. 12 is a graph showing an operational region of a decompression cam member and an exhaust gas recirculation cam member. (first embodiment)

In FIG. 12, in an engine starting rotational region a in which the engine rotational speed Ne is between 0 and a predetermined rotational speed Ne1 that is lower than the idling rotational speed, as shown in FIG. 4, FIG. 5, and FIG. 8, the first and second centrifugal weights 351 and 352 are together retained at the contracted position A by the set load of the return spring 43. In this process, the drive ring 45 connected to the second centrifugal weight 352 via the connecting projection 45a presses the roller 44 against the inclined face 58a of the concave cam 58 of the decompression cam member 47, and the decompression cam member 47 is therefore retained at the operating position C in which the convex cam 47a of the decompression cam member 47 projects further outward than the base circle face 25a of the valve operating cam 25.

Figure 10:
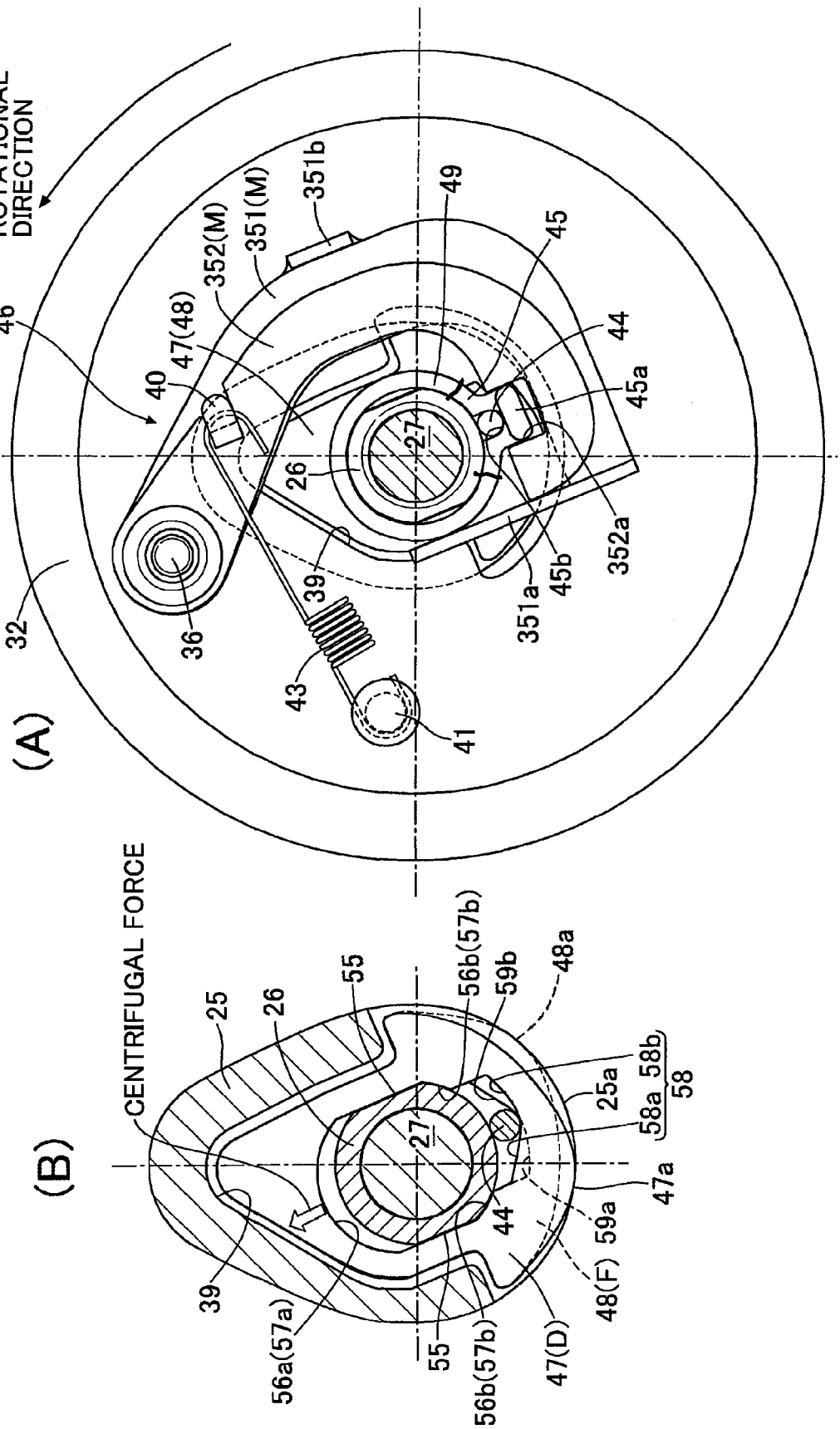
FIG. 10 is an operation diagram of the valve operating system showing a state of decompression release and exhaust gas recirculation suspension. (first embodiment)

If the recoil type starter 13 is now operated in order to start the internal combustion engine E, since the crankshaft 6 is cranked by the starter 13 via a starting tubular shaft 12 and at the same time the valve operating cam 25 is driven to rotate via the timing belt 33, etc., the convex cam 47a of the decompression cam member 47 pushes up the exhaust rocker arm 29e slightly during the compression stroke of the piston 7 as described above, and the exhaust valve 17e is opened slightly. The timing in this process is shown in FIG. 10. As a result, part of the compressed gas within the cylinder bore 3a is discharged to the exhaust port 16e to thus suppress the increase in compression pressure, the operating load on the starter 13 is therefore decreased, the crankshaft 6 can be cranked relatively lightly and swiftly, and the engine can thus be easily started.

When the engine is started and the engine rotational speed Ne increases beyond the starting rotational region a, as shown in FIG. 10 the moment around the pivot shaft 36 due to the total centrifugal force of the first and second centrifugal weights 351 and 352 counteracts the moment around the pivot shaft 36 of the first centrifugal weight 351 due to the set load of the return spring 43, the first and second centrifugal weights 351 and 352 swing outward as a unit in the radial direction from the contracted position A, the abutment piece 351a of the first centrifugal weight 351 abuts against the outer peripheral face of the distance collar 49 on the camshaft 26, both the first and second centrifugal weights 351 and 352 attain the intermediate extension position M, and only the first centrifugal weight 351 is prevented from extending therebeyond. Swinging of the second centrifugal weight 352 from the contracted position A to the intermediate extension position M during this process is transmitted to the connecting projection 45a so as to rotate the drive ring 45 in the anticlockwise direction in FIG. 10, and the roller 44 is moved to a position facing the bottom face 58b of the concave cam 58 of the decompression cam member 47. Therefore, the decompression cam member 47 is moved to the non-operational position D by the action of centrifugal force without interference from the roller 44, and the convex cam 47a is withdrawn inside the base circle face 25a of the valve operating cam 25.

In this process, in the exhaust gas recirculation cam member 48, as shown in FIG. 7, since the bottom face 59a of the concave cam 59 faces the roller 44 of the drive ring 45, the exhaust gas recirculation cam member 48 is also retained at the non-operational position F by centrifugal force without being restrained by the roller 44, and the convex cam 48a is withdrawn inside the base circle face 25a of the valve operating cam 25.

As hereinbefore described, the exhaust valve 17e is controlled so as to open and close as usual depending only on the original shape of the valve operating cam 25.

Since, when the first centrifugal weight 351 attains the intermediate extension position M, swinging to extend therebeyond is prevented by the camshaft 26, after the engine rotational speed Ne has increased to Ne1 or above the load acting on the return spring 43 is constant while the second centrifugal weight 352 does not depart from the abutment piece 351a of the first centrifugal weight 351. Therefore, in the engine rotational speed region Ne1 to Ne2, where the return spring 43 cannot be deformed by the centrifugal force of the second centrifugal weight 352 alone, that is, the low-speed running region b including idling, the second centrifugal weight 352 is retained at the intermediate extension position M.

When the engine rotational speed Ne attains Ne2 or above, that is, it enters the high-speed running region c, the centrifugal force of the second centrifugal weight 352 increases sufficiently, the moment around the pivot shaft 36 of the second centrifugal weight 352 due to the centrifugal force thereof becomes larger than the moment of the second centrifugal weight 352 due to the load of the return spring 43, as shown in FIG. 11 the second centrifugal weight 352 attains the extended position B, and the accompanying rotation of the drive ring 45 in the anticlockwise direction makes the roller 44 press the inclined face 59b of the concave cam 59 of the exhaust gas recirculation cam member 48 to thus make the exhaust gas recirculation cam member 48 move to the operating position G against the centrifugal force, and the exhaust gas recirculation cam member 48 makes the convex cam 48a project from the base circle face 25a of the valve operating cam 25. Therefore, as described above, during the intake stroke of the piston 7 the convex cam 48a of the exhaust gas recirculation cam member 48 pushes up the exhaust rocker arm 29e slightly, thereby opening the exhaust valve 17e slightly. As a result, exhaust gas remaining in the exhaust port 16e is sucked into the combustion chamber 15, that is, exhaust gas recirculation is carried out. This exhaust gas suppresses excessive increase in combustion temperature when a gas mixture is burned in the expansion stroke at a later stage, thus contributing to reduction of the NOx concentration in the exhaust gas and reduction in HC concentration, and consequently improving the fuel economy.

As hereinbefore described, the centrifugal mechanism 46 formed from the first and second centrifugal weights 351 and 352 and the return spring 43 operates the common drive ring 45 and operates the decompression cam member 47 and the exhaust gas recirculation cam member 48 in sequence, thereby simplifying the structure of the valve operating system 20, which has a decompression function and an exhaust gas recirculation function with desired characteristics without mutual interference, and making it compact.

Moreover, since the centrifugal mechanism 46 is mounted on the outside face of the driven timing pulley 32, and the decompression cam member 47 and the exhaust gas recirculation cam member 48 are housed in the recess 39 of the valve operating cam 25, which is integrally formed with the driven timing pulley 32, and are supported by the camshaft 26, it is possible to house the decompression cam member 47 and the exhaust gas recirculation cam member 48 within the valve operating cam 25, thereby making the valve operating system 20 yet more compact.

Furthermore, in the centrifugal mechanism 46, setting the contracted position A and the intermediate extension position M for the first and second centrifugal weights 351 and 352 and setting the extended position B for the second centrifugal weight 352 enables the operational timing for the decompression cam member 47 and the exhaust gas recirculation cam member 48 to be achieved easily and reliably.

Moreover, the intake rocker arm 29i and the exhaust rocker arm 29e for opening and closing the intake valve 17i and the exhaust valve 17e respectively are in sliding contact with the outer peripheral face of the valve operating cam 25 with mutually displaced phases, and it is thereby possible to open and close the intake and exhaust valves 17i and 17e by the single common valve operating cam 25, thus making the valve operating system 20 even more compact.

The present invention is not limited to the above-mentioned embodiment and may be modified in a variety of ways as long as the modifications do not depart from the spirit and scope thereof. For example, the valve operating cam 25 and the camshaft 26 may be molded integrally as a single component. The stopper piece 351b for restricting the extended position B of the second centrifugal weight 352 may be eliminated, and the extended position B for the second centrifugal weight 352 may be restricted by the roller 44 abutting against a side end wall of the bottom face 58b of the concave cam 58 of the decompression cam member 47.

Furthermore, when the present invention is applied to a valve operating system in which an intake cam and an exhaust cam are provided on a camshaft 26, a decompression cam member 47 and an exhaust gas recirculation cam member 48 may be housed in a cam that is close to a driven timing pulley 32. Furthermore, a timing transmission system formed from a drive timing pulley 31, a driven timing pulley 32, and a timing belt 33 may be of a gear type. In this case, the driven timing rotating member of the present invention is formed from a driven timing gear.

The invention claimed is:

1. A valve operating system of an internal combustion engine, the valve operating system comprising:
   a decompression cam member that is supported on a camshaft provided with a valve operating cam and that moves between an operating position in which an exhaust valve operating member is operated in an opening direction of an exhaust valve in a compression stroke of the engine and a non-operational position in which the exhaust valve operating member is released,
   an exhaust gas recirculation cam member that is supported on the camshaft and that moves between a non-operational position in which the exhaust valve operating member is released and an operating position in which the exhaust valve operating member can be operated in the opening direction of the exhaust valve in an intake stroke of the engine, and
   a centrifugal mechanism that is mounted on a driven timing rotating member driven by the crankshaft so as to rotate integrally with the valve operating cam, that makes the decompression cam member move to the operating position in a starting rotational region of the engine and to the non-operational position after starting, and that makes the exhaust gas recirculation cam member move to the nonoperational position in a low-speed running region of the engine and to the operating position in a high-speed running region, wherein the driven timing rotating member is integrally formed on one axial end portion of the valve operating cam, wherein the valve operating cam is provided with a recess surrounding the camshaft, the recess opening on a face on the other side of the driven timing rotating member that is opposite the valve operating cam and on a base circle face of the valve operating cam, the recess being closed at one axial end portion thereof by the valve operating cam, wherein the decompression cam member and the exhaust gas recirculation cam member are housed in the recess, wherein the centrifugal mechanism comprises a centrifugal weight which is swingably supported on the driven timing rotating member so as to close a part of an open face of the recess at its other axial end portion, and wherein the valve operating cam is fitted onto and secured to the camshaft, which is a separate body from the valve operating cam, such that formation of the recess on the valve operating cam can be done without interference from the camshaft.

2. The valve operating system for an internal combustion engine according to claim 1, wherein the centrifugal weight comprises:

a first centrifugal weight that is axially supported by the driven timing rotating member, swings from a contracted position to an intermediate extension position according to an increase in centrifugal force, and is prevented from swinging therebeyond, a second centrifugal weight that is similarly axially supported by the driven timing rotating member, swings together with the first centrifugal weight from a contracted position to an intermediate extension position according to an increase in centrifugal force, and swings on its own to an extended position according to an increase in centrifugal force after the first centrifugal weight stops at the intermediate extension position, and a return spring between the second centrifugal weight and the driven timing rotating member, the return spring urging the second centrifugal weight toward the contracted position side, wherein the second centrifugal weight is operatively connected to the decompression cam member and the exhaust gas recirculation cam member, wherein when the second centrifugal weight occupies the contracted position, the decompression cam member is controlled at the operating position and the exhaust gas recirculation cam member is controlled at the non-operational position, wherein when the second centrifugal weight occupies the intermediate extension position, both the decompression cam member and the exhaust gas recirculation cam member are controlled at the non-operational positions, and wherein when the second centrifugal weight occupies the extended position, the decompression cam member is controlled at the non-operational position and the exhaust gas recirculation cam member is controlled at the operating position.

3. The valve operating system for an internal combustion engine according to claim 2, wherein an intake valve operating member and the exhaust valve operating member are in sliding contact with an outer peripheral face of the valve operating cam with mutually displaced phases.

* * * * *